(12) United States Patent
Sanders et al.

(10) Patent No.: US 7,196,839 B1
(45) Date of Patent: Mar. 27, 2007

(54) SUPER-CONTINUUM UV SOURCE

(75) Inventors: Scott Thomas Sanders, Madison, WI (US); Joachim Werner Walewski, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/275,995

(22) Filed: Feb. 8, 2006

(51) Int. Cl.
*H01S 3/30* (2006.01)

(52) U.S. Cl. .......................... 359/333; 372/5
(58) Field of Classification Search ............ 372/5; 359/333
See application file for complete search history.

(56) References Cited

U.S. PATENT DOCUMENTS

| | | | |
|---|---|---|---|
| 5,745,284 A * | 4/1998 | Goldberg et al. ........... 359/344 |
| 5,909,306 A * | 6/1999 | Goldberg et al. ........ 359/337.1 |
| 6,031,854 A * | 2/2000 | Ming ........................... 372/22 |
| 6,208,673 B1 * | 3/2001 | Miyake ....................... 372/22 |

OTHER PUBLICATIONS

G. Genty, M. Lehtonen, and H. Ludvigsen; Route to broadband blue-light generation in microstructured fibers, Optics Letters / vol. 30, No. 7 / Apr. 1, 2005.

Chinlon Lin and R. H. Stolen; New nanosecond continuum for excited-state spectroscopy, Applied Physics Letters, vol. 28, No. 4, Feb. 15, 1976.

\* cited by examiner

*Primary Examiner*—Mark Hellner
(74) *Attorney, Agent, or Firm*—Boyle Fredrickson Newholm Stein & Gratz S.C.

(57) ABSTRACT

An ultraviolet super-continuum source with a fiber-optic may be provided with direct stimulation by a laser having a relatively narrow bandwidth, for example, less than the typical Raman shift in the material of the optical fiber to provide a super-continuum source extending for wavelengths below 400 nanometers.

19 Claims, 2 Drawing Sheets

SUPER-CONTINUUM UV SOURCE

STATEMENT REGARDING FEDERALLY SPONSORED RESEARCH OR DEVELOPMENT

This invention was made with United States government support awarded by the following agencies:
DOE DE-FC26-02NT41431.
The United States has certain rights in this invention.

CROSS REFERENCE TO RELATED APPLICATIONS

—

BACKGROUND OF THE INVENTION

The present invention relates to broadband ultraviolet light sources used in science and industry, and in particular, to a fiber-optic ultraviolet light source.

Broad-spectrum ultraviolet light sources coupled through a fiber-optic can be used for a wide variety of sensing and analysis applications. Normally, the source for a broad-spectrum ultraviolet light is an arc lamp in which gas is energized between opposed electrodes. This light source is relatively bulky, requires a high voltage, and is difficult to couple to a small diameter fiber-optic cable.

Non-ultraviolet broad-spectrum light sources using fiber-optics have been obtained by exciting fibers with narrow frequency light sources in a nonlinear mode as described in U.S. patent application Ser. No. 10/637,472 filed Aug. 8, 2003 assigned to the present inventors, and hereby incorporated by reference. In the invention of this previous application, a number of nonlinear mechanisms including: self-phase modulation, four-photon mixing, and stimulated Raman scattering act in concert to expand the spectrum.

As one moves to the shorter wavelengths of ultraviolet, the ability to sustain these nonlinear, frequency-spreading phenomenon is hampered by the high material dispersion of the fibers which tends to separate the frequencies of the pulse as a result of their different propagation speeds through the fiber. This pulse "walk off" suppresses the nonlinear effects substantially limiting the spectrum broadening.

Some success in creating a broad-spectrum fiber-optic source having short wavelengths in visible ranges has been obtained using two-stage process in which a first narrow-band laser such as a nitrogen laser excites a wide-band dye laser, the latter providing a broad-spectrum excitation pulse to the fiber-optic. A broad excitation pulse has been thought necessary to prevent obtaining a set of discrete "Stokes lines" that do not form a broad-spectrum-continuum when a narrow-band laser is used. Further, because as one moves to the ultraviolet region, light attenuation and phase dispersion becomes more severe, it is not clear whether nonlinear, frequency-spreading phenomenon can be used to create practical spectral broadening below a 400 nanometer wavelength.

SUMMARY OF THE INVENTION

The present inventors have determined that significant spectral broadening can be produced at ultraviolet frequencies without the need for an intervening, spectral broadening of the fiber optic excitation pulse, for example, by a second dye laser or the like. Direct excitation of the fiber-optic may be employed with the fiber optic limited to a single mode to avoid optical beating from multi-mode dispersion and to maximize the irradiance of the laser pulses.

Specifically, the present invention provides a fiber-optic super-continuum light source producing an ultraviolet-continuum in a wavelength range extending to less than 450 nanometers comprising a laser source producing pulses of light with a spectral width of less than 10 nanometers and a wavelength of less than 450 nanometers. An optical fiber assembly receives the pulses of light to provide output light having no less than two times the spectral width of the pulses from the laser source.

Thus, it is a one object of at least one embodiment of the invention to provide a fiber-optic, super-continuum ultraviolet source that can be driven with a single-stage, narrow-band laser.

The light output may include significant energy in wavelengths less than 350 nanometers.

It is thus another object of at least one embodiment of the invention to provide a super-continuum light source that provides a wavelength range extending to less than 350 nanometers in an optical fiber.

The spectral width of the laser source may be narrow, and in particular less than a Raman shift of the material of the optical fiber.

Thus, it is another object of at least one embodiment of the invention to take advantage of phenomenon other than Raman shifting to obtain a spectral-continuum.

The laser source may be a gas laser.

It is thus another object of at least one embodiment of the invention to provide a system that may avoid the need for organic dye laser systems.

The light output may have no less than 100 times the spectral width of the pulse.

It is thus another object of at least one embodiment of the invention to provide an extreme amplification of spectral width allowing use of narrow-band gas or solid state lasers and the like.

The optical fiber may substantially support only a single mode of light transmission.

Thus, it is an object of at least one embodiment of the invention to reduce damage to the fiber and multi-mode dispersion such as may decrease the effectiveness of the generation of a super-continuum.

The optical fiber may be a single mode fiber or may be a multiple mode fiber that is made to perform as a single-mode fiber using a mode suppresser.

Thus it is an object of at least one embodiment of the invention to provide flexibility in the use of different types of optical fibers.

These particular objects and advantages may apply to only some embodiments falling within the claims, and thus do not define the scope of the invention.

DETAILED DESCRIPTION OF THE PREFERRED EMBODIMENT

Figure 1:
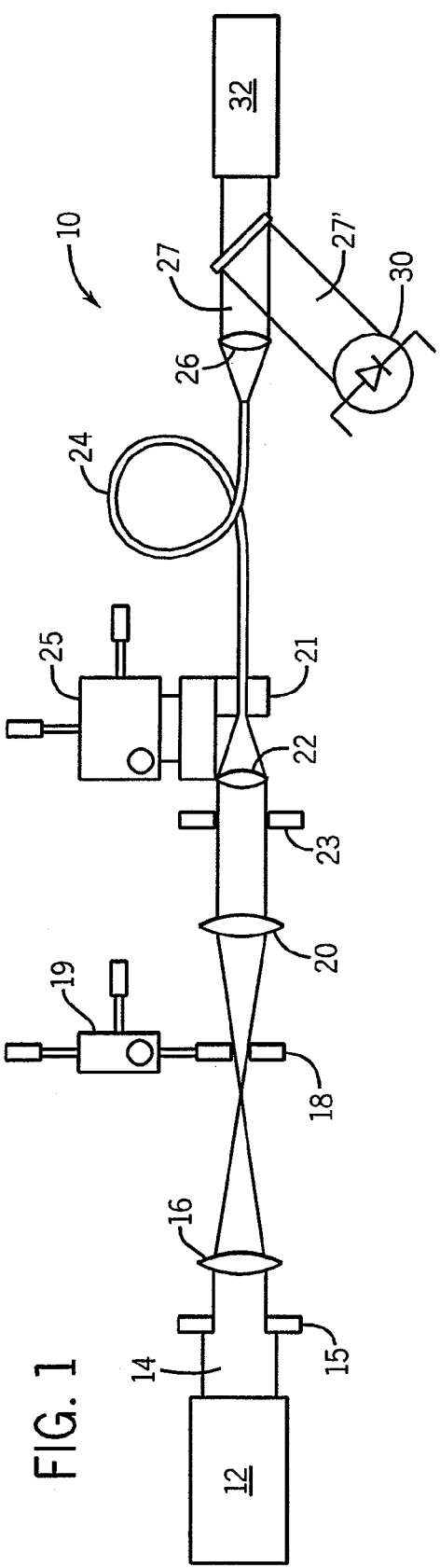
FIG. 1 is a schematic representation of the super-continuum light source of the present invention showing direct, single-mode excitation of a fiber-optic by a gas laser.

Referring now to FIG. 1, the super-continuum light source 10 of the present invention provides a gas laser 12 producing a beam of coherent light 14. The gas laser may, for example, be an air-cooled nitrogen laser commercially available from Spectra Physics, a division of Newport Corporation of Irvine, Calif. under the trade designation 337-Si. The center wavelength of the laser 12 is preferably 337.1 nanometers with a spectral bandwidth of 0.1 nanometers (or less than 10 nanometers and practically less than 5 nanometers) and is set up to produce a four nanosecond pulse at full width at half maximum (FWHM).

The light 14 from the laser 12 may be received by a collimator 15, collimating the light to the diameter of a lens 16, for example, the LA4716 lens available commercially from Thorlabs, Inc. having offices in Newton, N.J. Lens 16 may be an ultraviolet, fused silica plano-convex lens having a focal length of approximately 750 millimeters to focus the light 14 through a 50 micrometer pinhole 18 mounted on a sensitive x, y, z stage 19 for accurate alignment adjustment. A suitable stage 19 is commercially available from Thorlabs under the trade designation: MBT602 providing 50 nanometer resolution over an adjustment range of 4 millimeter.

Once the light 14 passes through the pinhole 18, it diverges and is received by a second lens 20 such as the LB4710, an ultraviolet grade, fused silica bi-convex lens commercially available from Thorlabs and having a focal length of approximately 300 millimeters. This lens 20 collimates the light 14 which is then directed to aspheric lens 22 such as is available from Thorlabs under the A397 trade designation, providing a focal length of 11 millimeters and a high numeric aperture.

An iris 23 is positioned between lenses 20 and 22 to eliminate diffraction rings caused by the 50 micrometer pinhole 18.

The aspheric lens 22 focuses the light into a cleaved bare, optical fiber 24 commercially available from Stocker Yale as NUV-320-K1 and having a two micrometer core. The pinhole 18, previously described, is sized and positioned to couple only a single mode (TEM00) of the laser pulses from laser 12 into an optical fiber 24. The end of the optical fiber 24 receiving the pulses and the lens 22 are secured by a fiber launch clamp 25 and/or a second x, y, z stage such as are available from Thorlabs.

The fiber 24 may be a 50-meter long single mode fiber UV-VIS with a silica core and a core diameter of about two micrometers. The 50-meter length of the fiber is chosen to provide for significant spectral broadening by allowing a high irradiance over a long interaction length, and yet to manage attenuation of the fiber which is approximately twenty-five percent for the 50-meter length at 337 nanometers The output continuum 27 exiting the optical fiber 24 is directed through a second aspheric lens 26 (Thor Labs A390-A) with a focal length of 4.6 millimeters which collimates the light onto a wedged beam splitter 28.

Continuum light 27' reflected off the beam splitter 28 illuminates a silicon photodiode 30 which senses its intensity such as available from Thor Labs DET210 providing a 350 MHz bandwidth with sensitivity from 200 to 1100 nanometers.

The light transmitted through the beam splitter 28 is received by a fiber optic using a standard collimation package through a patch cord having a 50 micrometer core such as is available from Oceans Optics of Dunedin, Fla. under the trade name P50-2-UV-VIS. This multi-mode fiber is connected to a spectrometer 32 of a type commercially available from Spectra Physics under the trade name 74050 equipped with a frame transfer camera.

The photodiode 30 serves as a gauge for pulse energies transmitted through the fiber 50, and the spectrometer records each transmitted spectrum in a single shot. The spectrometer 32 may be triggered externally by each laser pulse from the laser.

Figure 2:
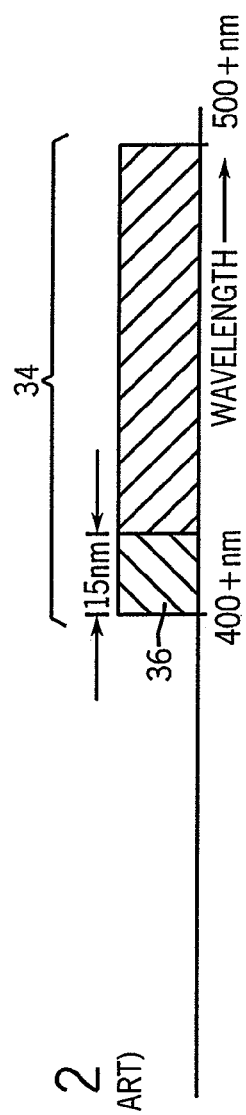
FIG. 2 is a spectral plot of light output provided by fiber-optic systems of the prior art showing spectral-width of the excitation pulse (narrow cross-hatching) superimposed on the spectral width of the light output (wide cross-hatching)

Referring now to FIG. 2, the prior art has provided an output continuum 34 stretching from somewhat above 400 nanometers to 500 nanometers or more by using an excitation pulse 36 having a spectral width of approximately fifteen nanometers.

Figure 3:
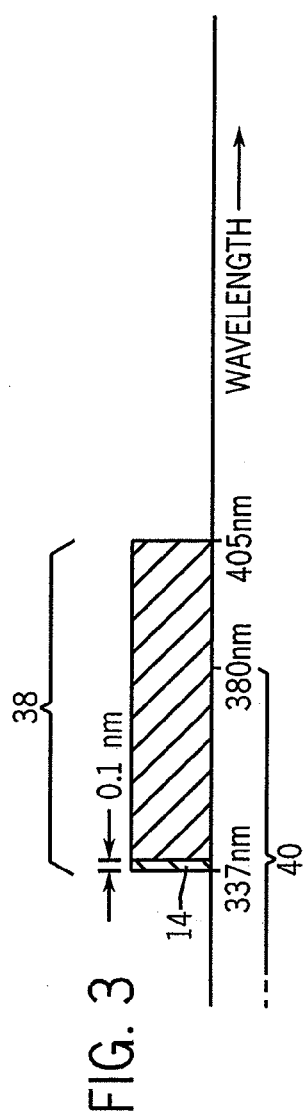
FIG. 3 is a figure similar to that of FIG. 2 showing the excitation pulse and light output of the present invention shifted into the near ultraviolet.
Figure 4:
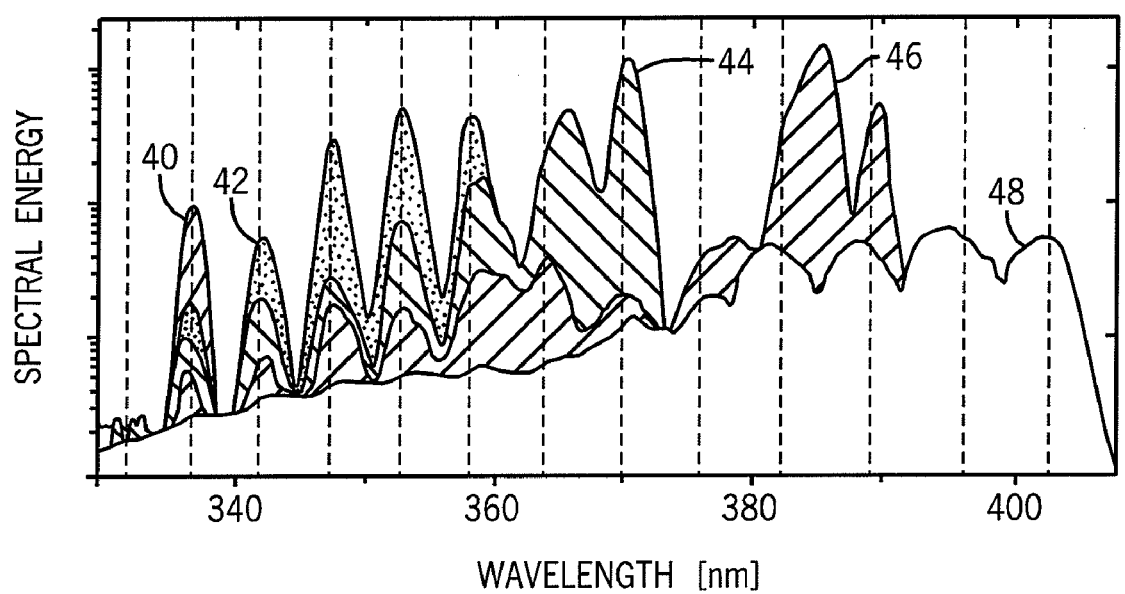
FIG. 4 is a series of plots showing the spectral output of the present invention for different pulse energies showing an increased range of spectral-continuum at higher energies.

In contrast, as shown in FIG. 3, the present invention provides an output continuum 38 stretching from 337 to 405 nanometers substantially within the near ultraviolet range 40 using excitation pulses of light 14 having a spectral width of approximately 0.1 nanometers.

Referring now to FIG. 3, the extent of the continuum 38 depends in part on the energy of each pulse of light 14. When the total energy per pulse is approximately 1.5 nanojoules, the spectrum is narrow, measuring from 337 to approximately 340 nanometers. In contrast, at 24 nanojoules per pulse, the continuum 42 extends to approximately 360 nanometers. At 31 nanojoules per pulse, the continuum 46 shows an extension to over 390 nanometers, but surprisingly at 34 nanojoules per pulse, the continuum 44 extends only to approximately 370 nanometers. Thus, large pulse energies do not necessarily lead to greater spectral broadening and at present, there is no explanation for this type of behavior other than possible fiber damage. At 46 nanojoules per pulse, the continuum 48 extends beyond 400 nanometers.

In this plot, each of the grid lines are spaced 13.2 THz apart representing the Raman shift in fused silica. Nonlinear mechanisms of the optical fiber 24 provide for a continuum rather than a set of separated Raman peaks as might be expected according to the teachings of the prior art. The dominant mechanism is likely Raman shifting accompanied by some Raman broadening, so that after several Raman shifts, a continuum emission results.

The spectral broadening provided by the invention is believed to generally be due to Raman pumping which is very efficient in the ultraviolet. Assuming a repetition rate of 250 kHz, the ultraviolet-continuum generated by this apparatus is 35,000 times brighter than a prior art quartz tungsten halogen lamp in terms of spectral radiance. Despite the high pulse powers, the average power of only about 10 milliwatts and duty cycle of the light 14 of less than 0.1 percent is not expected to significantly damage the optical fiber 24.

Referring again to FIG. 1, in an alternate embodiment to pursue higher energies, a fiber 24 with a larger core diameter, but still featuring single mode operation, may be used. The fiber may have an ultraviolet grade core and a larger core diameter. Commercial fibers meeting some of these requirements with a 50 micrometer core diameter and a 0.12 numerical aperture are available from CeramOptec of East Longmeadow, Mass. under the trade designation UV 50/125 A 12. This fiber is highly multi-mode (V-number=54), however, the fiber might be made to approximate an ordinary single mode fiber by coiling it as described in the reference "Single Mode Operation Of A Coiled Multi-Mode Fiber Amplifier" by Koplow, Jeffrey P., Kilner, Dahv A. V., and Goldberg, Lew in Opt. Lett., 25(7), pp. 442–444 (2000).

In an alternative embodiment, the laser 12 may be a continuous wave laser energizing a fiber 24 with approximately a two micrometer core. The laser may provide approximately seven watts of total power distributed among several ultraviolet wavelengths, typically from 351 to 364 nanometers, and with approximately twenty-five watts of power distributed among several visible wavelengths typically 458 to 515 nanometers such as is commercially available from Lasers suitable for this purpose, and are commercially available from Coherent Inc. of Santa Clara, Calif.

It is specifically intended that the present invention not be limited to the embodiments and illustrations contained herein, but include modified forms of those embodiments including portions of the embodiments and combinations of elements of different embodiments as come within the scope of the following claims.

We claim:

1. A super-continuum light source producing an ultraviolet continuum in a wavelength range extending to less than 450 nanometers, the super-continuum light source comprising:
    a laser source providing pulses of light with a spectral width of less than 10 nanometers and with a wavelength less than 450 nanometers; and
    an optical fiber assembly receiving the pulses of light and broadening the spectral width of the pulses to provide output light having a substantially continuous spectral width of no less than two times the spectral width of the pulses from the laser source.

2. The super-continuum light source of claim 1 wherein the spectral width of the laser source is less than a Raman shift in a material of the optical fiber.

3. The super-continuum light source of claim 1 wherein the spectral width of the laser source is less 1 nanometer.

4. The super-continuum light source of claim 1 wherein the laser source is a gas laser.

5. The super-continuum light source of claim 1 wherein output light having no less than one-hundred times the spectral width of the source.

6. The super-continuum light source of claim 1 wherein the optical fiber substantially supports only a single mode of light transmission.

7. The super-continuum light source of claim 6 wherein the optical fiber is a single mode fiber.

8. The super-continuum light source of claim 6 wherein the optical fiber includes a mode suppressor.

9. The super-continuum light source of claim 6 wherein the optical fiber is a multimode fiber.

10. A super-continuum light source producing an ultraviolet continuum in a wavelength range extending to less than 350 nanometers, the super-continuum light source comprising:
    a laser source providing pulses of light with a wavelength less than 350 nanometers; and
    an optical fiber assembly receiving the pulses of light to broaden the spectral width of the pulses of light to provide output light having a substantially continuous spectral width of no less than two times a spectral width of the pulses from the laser source.

11. A method of producing a super continuum light source comprising the steps of:
    (a) producing pulses of light with a spectral width of less than 10 nanometers and with a wavelength less than 450 nanometers; and
    (b) coupling the pulses of light into an optical fiber assembly to broaden the spectral width of the pulses of light to provide output light having a substantially continuous spectral width of no less than two times the spectral width of the source.

12. The method claim 11 wherein the spectral width of the pulses of light is less than a Raman shift in a material of the optical fiber.

13. The method claim 11 wherein the spectral width of the pulses of light is less 1 nanometer.

14. The method claim 11 wherein a source of the pulses of light is a gas laser.

15. The method claim 11 wherein output light having no less than one hundred times the spectral width of the source.

16. The method claim 11 wherein the optical fiber substantially supports only a single mode of light transmission.

17. The method claim 16 wherein the optical fiber is a single mode fiber.

18. The method claim 16 wherein the optical fiber includes a mode suppressor.

19. The method claim 16 wherein the optical fiber is a multimode fiber.

* * * * *